United States Patent [19]
Evans et al.

[11] 3,755,813
[45] Aug. 28, 1973

[54] MOVING TARGET SIGNAL PROCESSOR

[75] Inventors: Norol T. Evans, San Pedro; David D. Effinger, La Habra, both of Calif.

[73] Assignee: The Hughes Aircraft Company, Culver City, Calif.

[22] Filed: Nov. 1, 1971

[21] Appl. No.: 194,424

[52] U.S. Cl. .................................. 343/7.7, 343/7.5
[51] Int. Cl. ........................... G01s 9/42, G01s 9/10
[58] Field of Search ................ 343/7.7, 7.5, 17.2 PC

[56] References Cited
UNITED STATES PATENTS

| | | | |
|---|---|---|---|
| 3,341,847 | 9/1967 | Fried et al. ........................ | 343/7.5 |
| 3,673,590 | 6/1972 | Corvi et al. ........................ | 343/7.7 |
| 3,281,837 | 10/1966 | Van Hijfte ........................ | 343/7.5 |

Primary Examiner—Benjamin A. Borchelt
Assistant Examiner—G. E. Montone
Attorney—W. H. Macallister, Jr. and Lawrence V. Link, Jr.

[57] ABSTRACT

The moving target signal processor of one disclosed embodiment is adapted for use with a pulse compression type radar, and includes: a plurality of clutter canceller units having clutter rejection characteristics which are a function of the number of consecutive range sweeps, from any given antenna scan location, processed thereby; clutter detection circuits for providing alarm signals indicative of excessive clutter content in the uncompressed received signals and the canceller units' uncompressed output signals, respectively; and logic control circuits responsive to the alarm signals, for controlling the number of transmissions at each scan location so that the processor's output signals have less than a predetermined clutter energy content.

27 Claims, 15 Drawing Figures

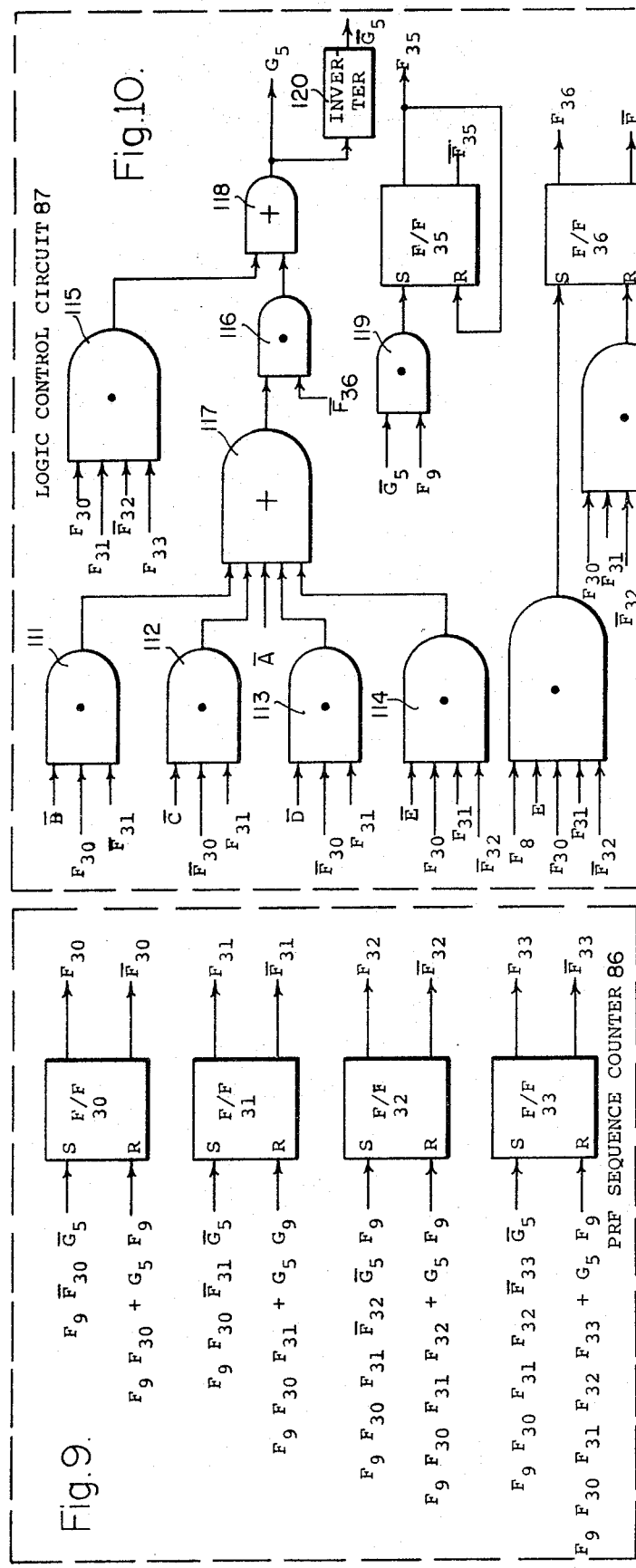

MOVING TARGET SIGNAL PROCESSOR

BACKGROUND OF THE INVENTION

This invention relates generally to MTI signal processors; and more particularly to such processors which automatically select the appropriate level of MTI operation, and which may be used in pulse compression type radar systems to reduce the clutter energy content in the received radar signal prior to pulse compression.

Prior clutter recognition circuits in pulse compression radar systems have generally been mechanized to detect clutter after the received radar signal has been compressed or decoded. Also these prior art systems have not provided for automatic selection of the level of MTI operation which maintains the clutter level in the output signal below preselected limits regardless of the type clutter environment encountered, while minimizing the radar time on target.

Systems which attempt to recognize clutter signals after pulse compression have several inherent shortcomings, such as requiring a large dynamic range for both the pulse compression and MTI circuits. A large dynamic range is needed in these prior systems to accommodate the high signal levels of time compressed clutter energy. Also, in pulse compression systems having a large compression ratio, if clutter rejection is implemented after pulse compression the clutter recognition circuits may be energized by time side lobes from large real targets. Further, the conventional approach of pulse compression prior to clutter cancellation can cause a reduction in the system's sensitivity to real targets, due to the constant false alarm rate action inherent in some pulse compression circuits. For example, in the case of prior art single level (0° − 180° phase coding) digital pulse compression systems operating in extended clutter, such as caused by rain, target signals embedded in clutter would be suppressed by the pulse compression processing; and the input clutter level would not cause a detectable rise in the decoded output level.

SUMMARY OF THE INVENTION

According to one preferred embodiment of the subject invention, a moving target signal processor is provided which is adapted for use in a pulse compression, scanning type radar. The processor comprises a plurality of clutter canceller units each of which have different clutter cancellation characteristics that are a function of the number of consecutive transmissions occurring at any given scan location. A clutter detection circuit provides alarm signals indicative of the clutter energy content in the uncompressed received radar signal and in the uncompressed output signals from each of the canceller units. A logic circuit responds to the alarm signals and to the number of prior transmissions at the given scan location, to control the radar such that the clutter energy content of the processor's output signal is below a preselected level.

It is therefore an object of the subject invention to provide a moving target signal processor which automatically adapts its level of MTI operation to the clutter environment so as to maintain the clutter energy content in its output signals below a preselected level, while minimizing the radar time required at each scan location.

Another object is to provide an MTI pulse compression system in which clutter signals are detected and their level reduced prior to pulse compression; thereby lessening the dynamic range requirements on the MTI and pulse compression circuits.

A further object is to provide an MTI processor adapted for use in pulse compression type radars for detecting clutter in the received radar signal prior to pulse compression, and which automatically selects the type of MTI processing required to minimize the radar time while maintaining an acceptable level of clutter energy content in the processor's output signals.

DESCRIPTION OF THE DRAWINGS

The novel features of this invention as well as the invention itself will be better understood from the accompanying description taken in connection with the accompanying drawings, in which like reference characters refer to like parts and in which:

FIGS. 9 and 10 are block diagrams showing the PRF sequence counter, and logic control circuitry, respectively, of FIG. 2 in greater detail;

FIGS. 11, 12, and 13 are block diagrams of suitable mechanizations for the alarm flip-flop circuits of FIG. 3;

DETAILED DESCRIPTION OF THE PREFERRED EMBODIMENT

Figure 1:
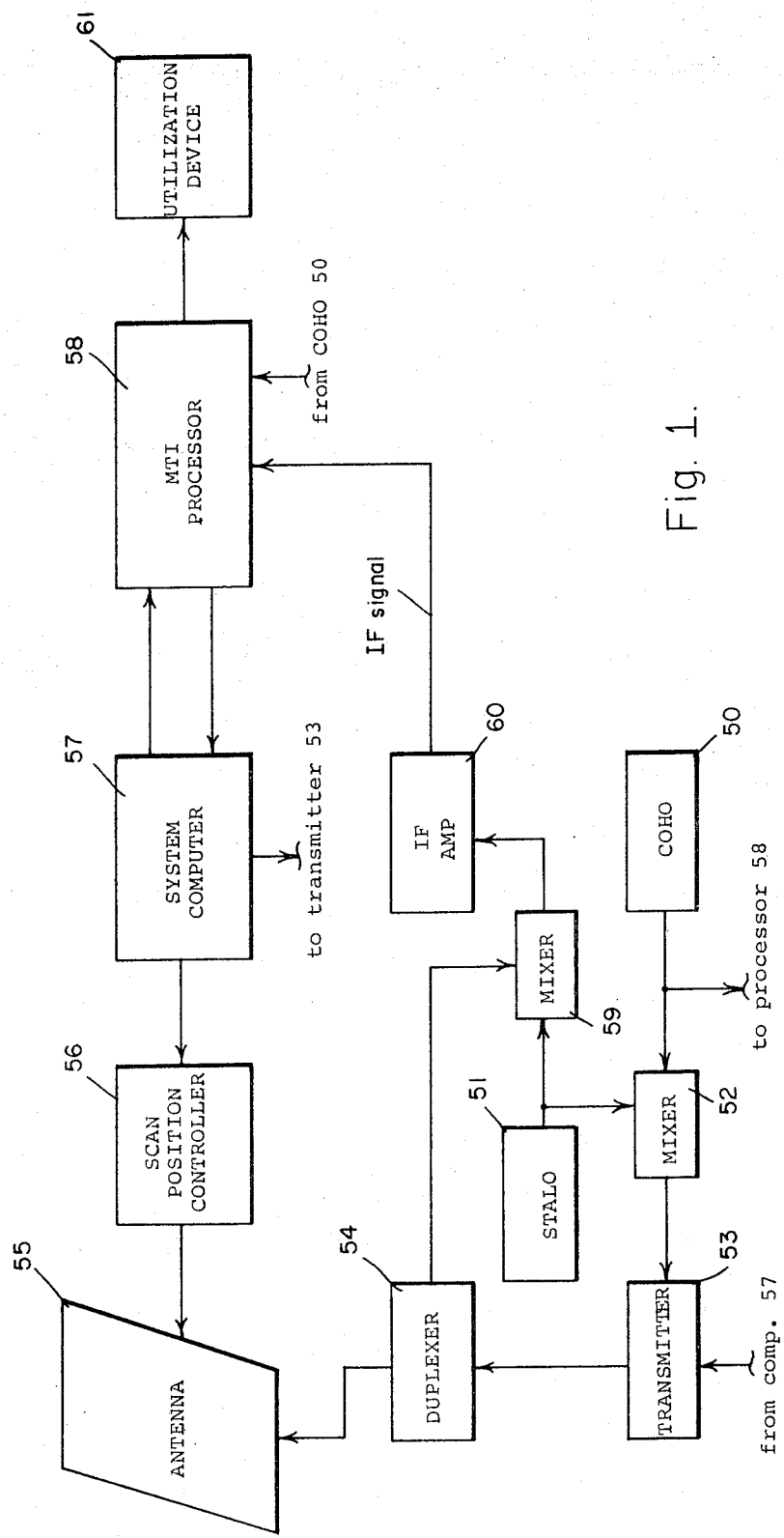
FIG. 1 is a block diagram of a radar system incorporating a moving target signal processor in accordance with the subject invention.

Referring now to the drawings, FIG. 1 shows a radar system incorporating an MTI processor in accordance with the subject invention. As there shown, signals from a coherent oscillator (COHO) 50 and a stable local oscillator (STALO) 51 are heterodyned in a mixer 52 and the resulting signal is applied to a transmitter unit 53. Transmitter 53 applies coherent output pulses through a duplexer 54 to an antenna 55.

The direction of the transmitting and receiving beams of antenna 55 is controlled by a scan position controller 56. Antenna 55 may be of the electronic scan type in which the relative phase of the signals applied to the individual array elements is controlled by scan position controller 56. System computer 57 controls the scan position unit 56 so that the antenna beam is directed in accordance with a preprogrammed pattern. As will be described subsequently, the number of consecutive transmission at any given scan location is determined by MTI processor 58. Computer 57 also provides timing and synchronization pulses to transmitter 53 and processor 58.

Reflected energy received by antenna 55 is applied through duplexer 54 and is heterodyned in a mixer 59 to provide an IF signal representative of the received radar energy. This IF signal is processed within an IF amplifier 60 and is then applied to MTI processor 58.

In accordance with one embodiment of the invention, transmitter 53 provides a relatively long, phase encoded output pulse; and processor 58 after first detecting and reducing clutter energy, if any is present in the received IF signal, then compresses or decodes the resulting signals. For example, the transmitted pulse may be 31 times longer than the compressed range bins, hereinafter simply referred to as range bins, to effect a pulse compression gain of 15 db for point source targets.

As mentioned above, the features of the subject invention which provide clutter recognition and reduction prior to pulse compression, avoid serious limitations inherent with most prior art systems. For example, clutter reduction prior to pulse compression greatly reduces the dynamic range requirements on processor circuits; and clutter detection on high range side lobes of large real targets is avoided. Also signal detection degradation due to target signal suppression by clutter during pulse compression is reduced by the processing techniques of the invention.

A utilization device 61 is coupled to the output circuit of processor 58 and is adapted for further processing the output signals therefrom. Utilization device 61 may include, for example, a display system or a target tracking computer.

Figure 2:
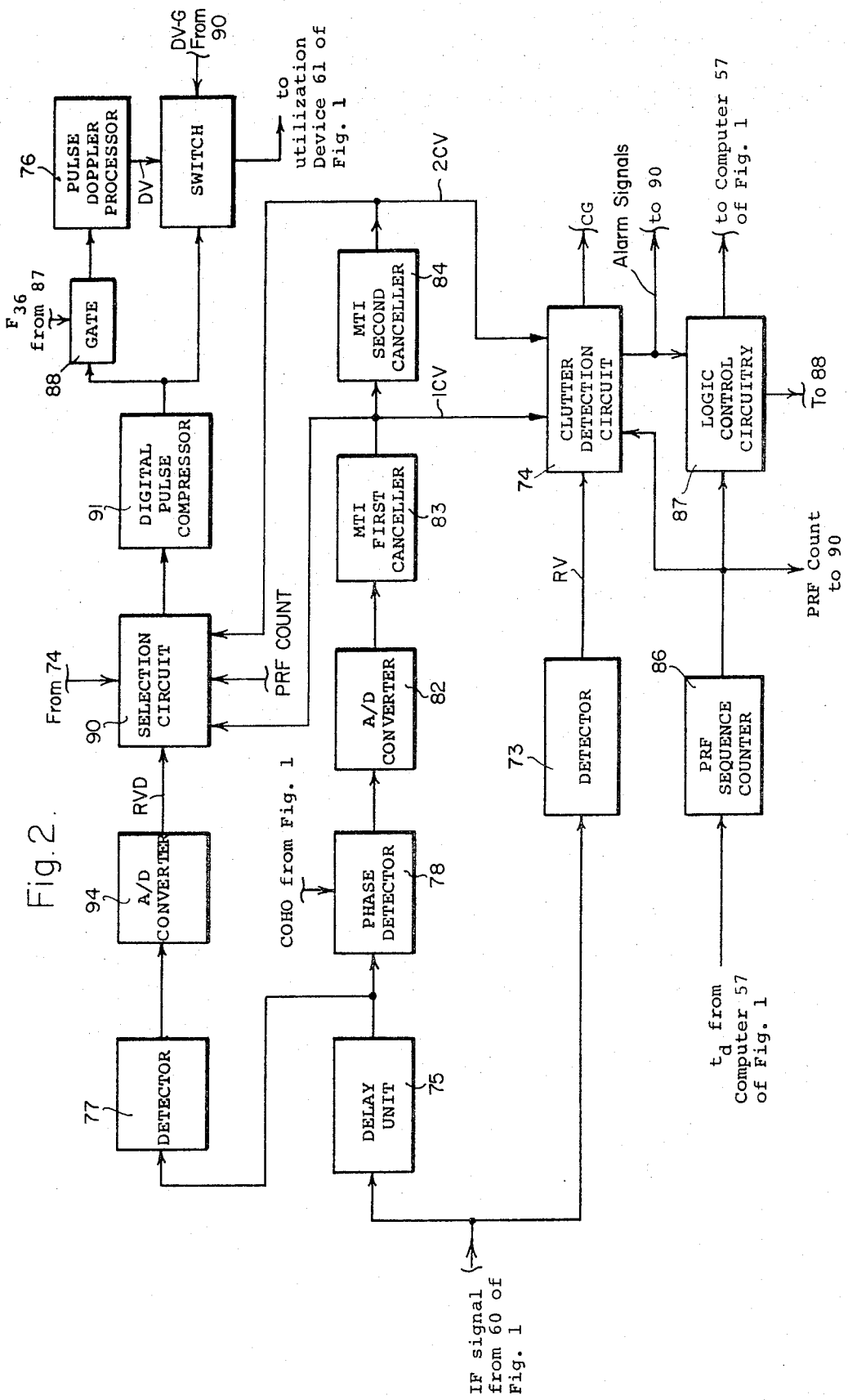
FIG. 2 is a block diagram of one preferred embodiment of a moving target signal processor in accordance with the invention.

Reference is now directed primarily to FIG. 2 which shows one preferred embodiment of a moving target signal processor in accordance with the invention. As shown in the lower central portion of FIG. 2, the IF signal from amplifier 60 (FIG. 1) is applied to an amplitude detector 73 and the output signal therefrom, designated "RV" for raw video, is applied to one input channel of a clutter detection circuit 74. The IF received signal from amplifier 60 (FIG. 1) is also applied through a delay unit 75; and is then applied in parallel to an amplitude detector 77, and a phase detector 78.

As will be explained subsequently, unit 75 provides the proper time delay to compensate for the time lag inherent in providing clutter gate signals indicative of clutter in the uncompressed received signals. The clutter gate signals may be used, for example, to control a "clutter locking" circuit such as described and shown in section 9.4 of the text "Radar Design Principles", by Fred E. Nathanson, McGraw-Hill Book Company, New York, New York.

The delayed IF signals from unit 75 are processed in phase detector 78 with the COHO reference signal from unit 50 of FIG. 1; and the resulting output signals are applied to an A to D converter 82. The digital output signals from converter 82 are processed in an MTI first canceller 83 and then in a second canceller 84.

It is noted that in the interest of maintaining the clarity of the drawings a single composite lead such as lead 85, for example, is shown for applying multiple bit digital signals. Also a single channel is shown for the phase detected video from unit 78 through second MTI canceller 84; although, preferably "complex units" for processing inphase and quadrature signals are used to avoid the 3 db loss in sensitivity encountered in single channel systems. Additionally, timing signals, such as clock pulses, are provided to all digital units from computer 57 (FIG. 1) for the synchronization of these units. The application of the clock pulses is not illustrated in the drawings nor included in the following logic equations so as to maintain the clarity of the drawings and description. However, it is understood that all digital operations occur only in coincidence with a clock pulse.

Still primarily considering FIG. 2, the output signals from clutter canceller units 83 and 84, designated 1CV for first canceller video, and 2CV for second canceller video, respectively, are applied to clutter detection circuit 74. In response to the 1CV, 2CV and raw video signals, as well as to PRF count signals applied from sequence counter 86, detector 74 provides alarm signals and the clutter gate signal. The alarm signals are representative of whether or not the clutter energy content of the raw video, the 1CV and the 2CV signals, respectively, is less than a predetermined level. The number of transmissions which have occurred at a given scan location, as indicated by the PRF count, is utilized to insure that the output signals from the canceller units have had time to build up to an effective operating level prior to their analysis for clutter content.

In response to the alarm signals and to the PRF count, a logic control circuit 87 provides command signals to computer 57 (FIG. 1), to cause additional transmissions at any given scan location until the clutter content of one of the raw video, the 1CV or the 2CV signals is within preselected limits. In the event that after a predetermined number of transmissions none of these just mentioned signals have an acceptable level of clutter energy content, then logic control circuit 87 commands a pulse doppler burst of from 12 to 20 transmissions, for example. The command signal applied from logic control circuit 87 to computer 57 may be used therein, for example, to enable an inhibit gate which interrupts the antenna scan sequence for the next transmission period. Hence the next transmission will be at the same scan location each time an output signal is provided by logic control circuit 87.

The clutter gate signal, designated CG, produced by clutter detector circuit 74 indicates the presence of clutter energy in the uncompressed nondelayed raw video. As will be explained subsequently, unit 75 may have a time delay equal to 37 range bins, for example, to allow for the time lag of detection circuit 74 in detecting the presence of clutter in raw video; whereby the signals from unit 75 are in time synchronism with the clutter gate signal.

The delayed raw video from A to D converter 94, as well as the 1CV and 2CV signals are applied to a selection circuit 90. In response to the alarm signals from clutter detection circuit 74 and to the PRF count signals, the selection circuit 90 couples the input channel which has an acceptable clutter energy content to a digital pulse compression unit 91. If, however, after a predetermined number of range sweeps at the same scan location none of the input signals to selection circuit 90 are acceptable, then the 2CV signals are applied through circuit 90, pulse compressor 91 and gate 88 to a digital pulse doppler processor 76. The MTI processed, and pulse compressed output signal from unit 91 is applied through switch 89 to utilization device 61 of FIG. 1, if one of the signals applied to selection circuit 90 has an acceptable clutter energy content during the predetermined number of range sweeps. Otherwise, following the processing interval of doppler processor 76, the output therefrom is applied through switch 89 to utilization device 61. It is noted that when operating in a clutter environment there will be interpulse periods in which none of the signals applied to the selection circuit have acceptable clutter energy content, and during these interpulse periods the selection circuit will not provide an output signal.

An example of a suitable MTI canceller for units 83 and 84 is the digital equivalent of the circuit shown in FIG. 9.7(a) on page 328 of the above cited "Radar Design Principles" text. It is again noted that the clutter canceller is preferably mechanized in the dual (inphase and quadrature components) phase configuration.

Digital pulse doppler processor 76 of FIG. 2 could be, or example, of the type shown in FIG. 14-17 on page 590 of the above referenced text. The digital equivalent of the circuit of FIG. 12-7 on page 470 of this "Radar Design Principles" book would be suitable for pulse compressor 91; and transmitter 53 (FIG. 1) would then include suitable conventional circuitry (not shown) for 0°–180° degree phase encoding on alternate range bins of each transmitted pulse.

Figure 3:
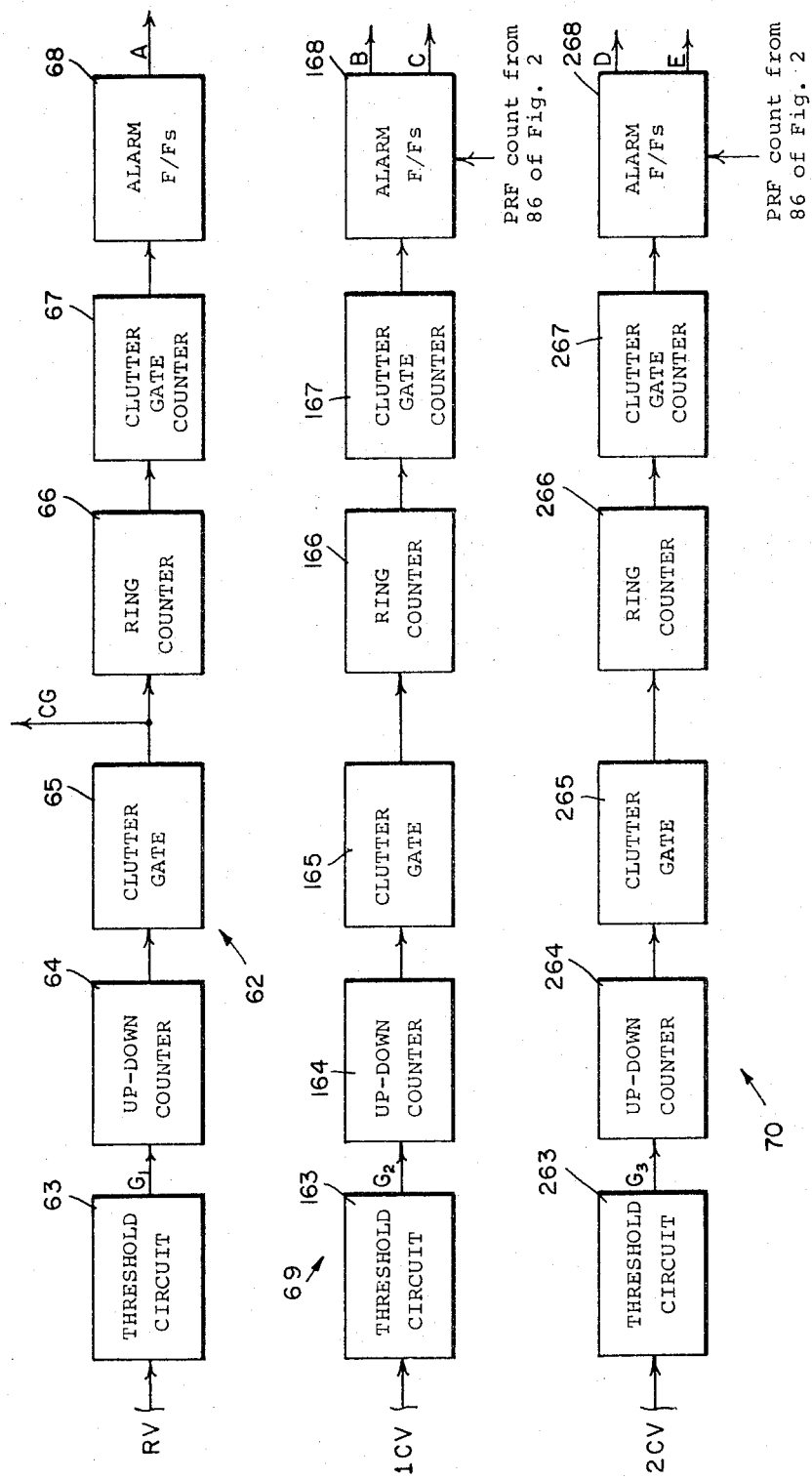
FIG. 3 is a block diagram showing the clutter detection circuits of the processor of FIG. 2 in greater detail.

Reference is now directed primarily to FIG. 3 which depicts the detection circuit 74 of FIG. 2 in greater detail. As there shown a first channel 62 for processing the raw video (RV) includes a threshold circuit 63, an updown counter 64, a clutter gate 65, a ring counter 66, a clutter gate counter 67, and an alarm flip-flop 68.

The threshold level of threshold circuit 63 is selected as low as possible without causing excessive clutter false alarms; for example, 3 db above rms receiver noise level. The output signal of threshold circuit 63, designated $G_1$, is a logical 1 when the threshold level is exceeded and a logical 0 when the raw video is less than the threshold level. The voltage levels corresponding to the logical 1 and logical 0 conditions may be any two distinctive voltage levels which are convenient for mechanizing the logic equations presented hereinafter.

The output signal of threshold circuit 63 ($G_1$) is applied to up-down counter 64 which counts up one count in response to a 1 level input signal and counts down one count for a 0 input signal. With a known statistic for the input signal, this type of counter is a very simple form of a Markov processor. The expected value in counter 64 will be close to zero when only receiver noise is being processed. For the above described system in which the transmitted pulse extends over 31 compressed range bins, for a large amplitude real target counter 64 would nominally count up to 31; and then count down towards zero when the target signal ceases. However, with a 3 db threshold level there is a false alarm rate due to thermal (receiver) noise on the order of 0.13, for example; and hence there is some probability that the counter will count beyond 31 in response to a single target. The below equation gives the probability of at least "$r$" noise false alarms in "$n$" sampling periods; and Table I tabulates the probability of a given number of noise false alarms out of various groups of sampling periods.

$$\sum_{s=r}^{n} \binom{n}{s} p^s q^{n-s}$$

TABLE I $P_{fa}(r/n)$ = probability of $r$ noise false alarms out of $n$ samples $P_{fa}(2/2) = 0.13^2 = 0.017$ probability of 2 successive noise false alarms $P_{fa}(6/6) = 0.13^6 = 4.8 \times 10^{-6}$ = probability of 6 successive false alarms $P_{fa}(7/8)$ = 4.4 × 10$^{-6}$
$P_{fa}(8/10)$ = 2.9 × 10$^{-6}$
$P_{fa}(9/12)$ = 1.6 × 10$^{-6}$
$P_{fa}(10/14)$ = 8 × 10$^{-7}$
$P_{fa}(11/16)$ = 4 × 10$^{-7}$
$P_{fa}(12/18)$ = 1 × 10$^{-7}$
$P_{fa}(13/20)$ = 1 × 10$^{-7}$
$\Sigma$ = 1.51 × 10$^{-5}$ The sum of the cases from $P_{fa}(6/6)$ to $P_{fa}(13/20)$ defines an upper bound of $1.51 \times 10^{-5}$, which is the probability of a single target (31 range bins) causing a clutter gate detection when the clutter recognition threshold of clutter gate 65 is set at 37, i.e. six more than nominally expected from a single target.

The count of counter 64 in response to thermal noise only, can be determined by computing the nth power of the probability matrix which describes the counter; and the probability of receiver noise alone exceeding the clutter recognition threshold is insignificantly small.

Two thresholds are used on the clutter gate circuit 65. First a count of 37 has been selected, corresponding to a false alarm on large targets of $1.5 \times 10^{-5}$, to initiate clutter gate detection. The up-down counter 64 is mechanized so as not to allow a count above 37 in extended clutter; and the clutter gate detection is deenergized when the counter drops below a count of 10, which is the expected count 37 range bins after clutter signals have terminated. It will be recalled from the description of FIG. 2 that the IF received signals applied to the canceller units 83 and 84 are delayed 37 range bins. This allows the clutter gate provided by channel 62 to be in time alignment with the data processed by clutter locking circuits (not shown). The clutter gate signal (CG) is applied to ring counter 66.

For the above-described example wherein the transmitted pulse has a time duration equal to 31 range bins (clock pulse periods), ring counter 66 is mechanized to count up to 31, reset, and repeat the counting and resetting cycle during the total time period that clutter gate circuit 64 provides a CG output signal.

The clutter gate counter 67 senses each time ring counter 66 passes through the count of 31, and counts up by one in response thereto. Therefore the count held by counter 67 is indicative of the number of groups of 31 range bin increments, on any given range sweep, that contained clutter. As used herein the term range sweep means that portion of the receiving period following each transmission, from which the received energy is processed. When counter 67 reaches a preselected threshold count, for example 3 to 10 depending on the system application, flip-flop 68 is set, thereby providing an A alarm signal.

Channels 69 of FIG. 3 processes the 1CV signal from first clutter canceller unit 83 of FIG. 2 in a manner similar to that described above for channel 62 and the RV signals. The respective units of channel 69 have been assigned reference numerals having the same units and tenths digits of the corresponding units of channel 62 except that the reference numerals for channel 69 are in the 100 series. Similarly channel 70 processes the 2CV signals from the second clutter canceller; and respective units thereof have been assigned reference numerals corresponding to their counterparts in channel 62, except that they are in the 200 series.

The A alarm signal from flip-flop 68 is sensed at the end of the range sweep, and one clock time later flip-flop 68 as well as all counters, are reset to allow the data from the next range sweep to be processed in a similar manner.

During the second range sweep initiated at the same scan location by the A alarm signal, channel 69 operates to observe the clutter residue in the output signal from first clutter canceller 83. If this clutter residue extends over too large of a range interval, flip-flop circuit 168 generates a B alarm signal effective to order a third transmission. During the third range sweep both the output signals from the first and the second MTI cancellers will be sensed. If the radars PRF (pulse repetition rate) is such as to provide a 60 mile range sweep, for example, then clutter signals from the first ambiguous range interval (60 to 120 miles) may be received. In such an event a C alarm signal may not be generated after the third range sweep but a D alarm indicative of the output signal from the second clutter canceller may be produced. Consequently, the output signal from the first canceller unit would be selected for further processing. Alternatively, if the clutter spectrum is wide due to rain or chaff, for example, during the third range sweep a C alarm signal would be generated but not a D alarm, in which case the output from the second canceller would be selected. Flip-flop circuits 268 (FIG. 3) also provide an E alarm signal indicative of the clutter residue from the second canceller, during the first ambiguous range interval (fourth range sweep) exceeding the preselected value. The E alarm signal is effective to command the into an MTI-range gated pulse doppler mode which may require from 12 to 20 transmissions, for example; depending on the number of doppler filters implemented in the pulse doppler processor. The rationale underlining the above described automatic selection of the proper level of MTI operation is as outlined below.

1. No clutter — MTI not used, delayed raw video used for processor's output signal.
2. Moderate land clutter — single MTI canceller used.
3. Large amount of land clutter — double MTI canceller used.
4. Moderate rain or chaff — double MTI canceller used.
5. Heavy rain or chaff — MTI range gated pulse doppler processor used.

As indicated above, PRF sequence counter 86 (FIG. 2), provides an indication of the number of consecutive range sweeps which have taken place at a given scan location; and this PRF count signal is used in conjunction with the alarm signals for selecting the signal applied through selection circuit 90. A summary of the logic for selection of the signals applied to pulse compressor 91, as well as for controlling the number of transmissions per scan position, is outlined in Table II below.

TABLE II

| Range Sweep At Same Scan Location | State of Alarm F/F's | |
|---|---|---|
| 1 | A | order a second transmission |
|   | $\bar{A}$ | MTI not required |
| 2 | A$\bar{B}$ | use first MTI canceller output |
|   | AB | order another transmission |
| 3 | ABC$\bar{D}$ | use first MTI canceller output |
|   | ABC$\bar{D}$ | use second MTI canceller output |
|   | ABCD | order another transmission |
| 4 | ABCDE̅ | use second MTI canceller output |
|   | ABCDE | order pulse doppler burst |

The operation of the subject invention may be better understood by a consideration of the mechanization of the units comprising channel 62 of FIG. 3. A suitable mechanization for up-down counter 64 is shown in FIG. 4 as comprising six flip-flops (F/F) designated 1 through 6 with F/F-1 providing the least significant digit (LSD) of the counter's output signal, and F/F-6 supplying the most significant digit (MSD).

In order to maintain the clarity of the drawings, in lieu of showing a maze of AND/OR gates, the organization of which is well known by those skilled in the art, the logic equations defining the signals utilized to control the set and reset input terminals of the various F/F circuits are shown on the drawings adjacent to the terminals. In these logic equations the logical OR operation is indicated by a "+" sign between terms or groups of terms; and the logical AND operation by the absence of a symbol between terms or groups of terms. To further clarify the symbology adopted herein, the AND and OR gate implementation for the signal applied to the set input terminal of F/F-1 is shown in FIG. 4, as comprising OR gates 101 and 103; and AND gates 102, 104 and 105.

Figure 4:
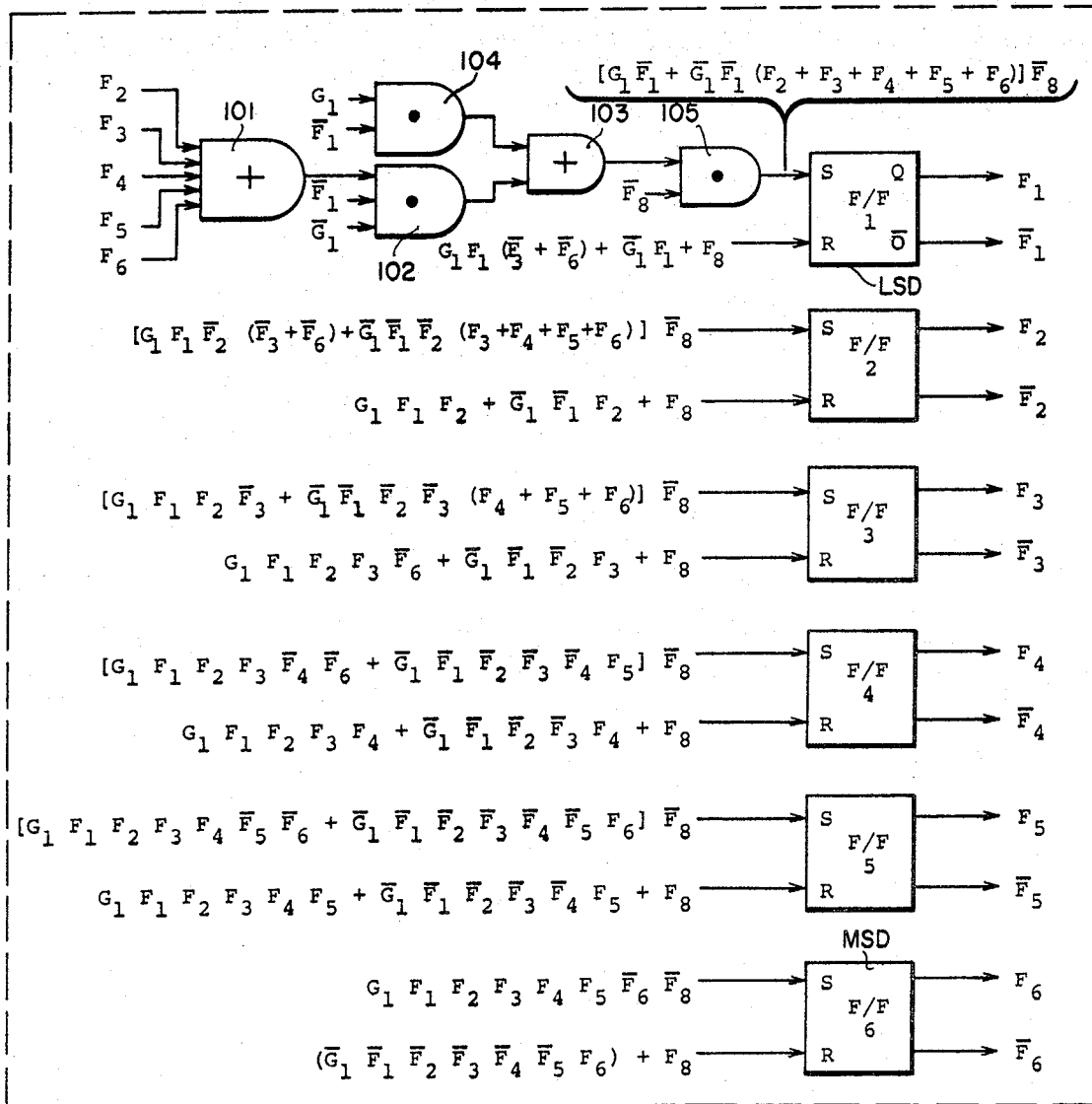
FIG. 4 is a block diagram of an up-down counter suitable for use in the detection circuits of FIG. 3.

The term $G_1$ shown in FIG. 4, is the output signal from threshold circuit 63 (FIG. 3) and is a logical 1 when the applied raw video (RV) signal exceeds the preselected threshold level. The signal $F_8$ is designated the "dead time trigger" and is provided by the circuit shown in FIG. 5.

Figure 5:
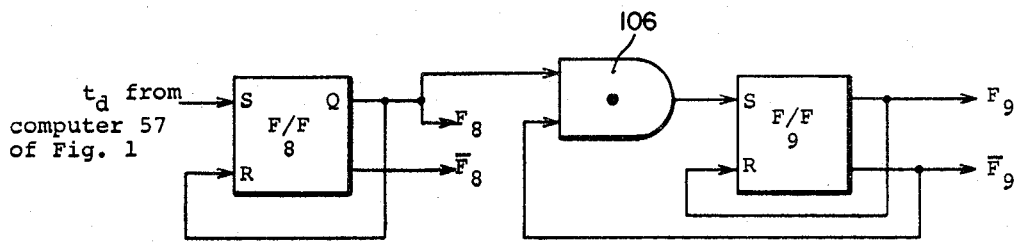
FIGS. 5, 6, 7 and 8, are block diagrams of a timing signal circuit, a clutter gate circuit, a ring counter, and a clutter gate counter, respectively, suitable for use in the clutter detection circuits of FIG. 3.

Referring momentarily to FIG. 5, F/F-8 is set by the trigger pulse $t_d$ applied from system computer 57 (FIG. 1). Trigger pulse $t_d$ is indicative of the end of the active ranging time period following each transmission, i.e., the end of the range sweep. The signal $F_8$ from the Q output terminal of F/F-8 is applied to the reset input terminal thereof, whereby the F/F is reset during the first clock pulse after it is set. As mentioned previously to maintain the clarity of the drawings, the application of clock pulses is not shown nor included in the logic equations. However, it is understood that all digital operations occur in synchronism with clock pulses provided by system computer 57 (FIG. 1), for example.

Still considering FIG. 5 a "delayed dead time trigger" $F_9$ is provided by F/F-9 which is set in response to the signal $\bar{F}_9 F_8$ applied from AND gate 106; and is reset on the following clock pulse by the signal $F_9$ applied to the reset input terminal thereof.

Returning now to the description of the up-down counter 64 shown in FIG. 4, the counter counts up one count each clock pulse period in which the signal RV exceeds the threshold level of unit 63, that is, in response to a signal $G_1$ being produced by unit 63. The counter counts down one count during each clock pulse period during which a signal $G_1$ is not applied. The counter is limited to a preselected maximum count such as 37, for example, and to a preselected minimum count such as 0, for example. The maximum count feature maintains the statistical validity of the clutter detection following operations in extended clutter. Also, it is noted that the counter is reset at the end of each range period by the dead time trigger signal $F_8$.

Figure 6:
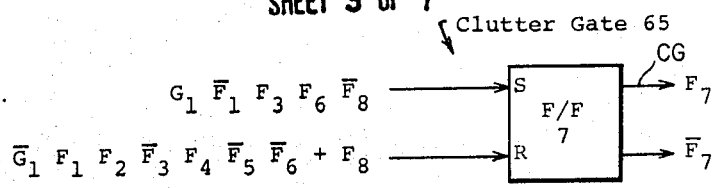

F/F-7 shown in FIG. 6 mechanizes clutter gate 65 of FIG. 3. In the selected embodiment F/F-7 is set on the count of 37 and provides the signal $F_7$ which is the same as the clutter gate signal (CG) indicated in FIG. 3. F/F-7 is reset at a count of 10 or at the end of each range sweep. As mentioned previously the count value at which the clutter gate F/F-7 is set is determined by the statistical nature of the signals and the system's application. For example, in a pulse compression system having a 31 to 1 pulse compression ratio, a clutter threshold level of 37 implies that a large target signal would have to be encompassed by 6 noise false alarms to produce an erroneous clutter gate indication. The lower threshold of 10 for resetting F/F-7 is selected statistically as an indication that the clutter content in the received signal has vanished.

Figure 7:
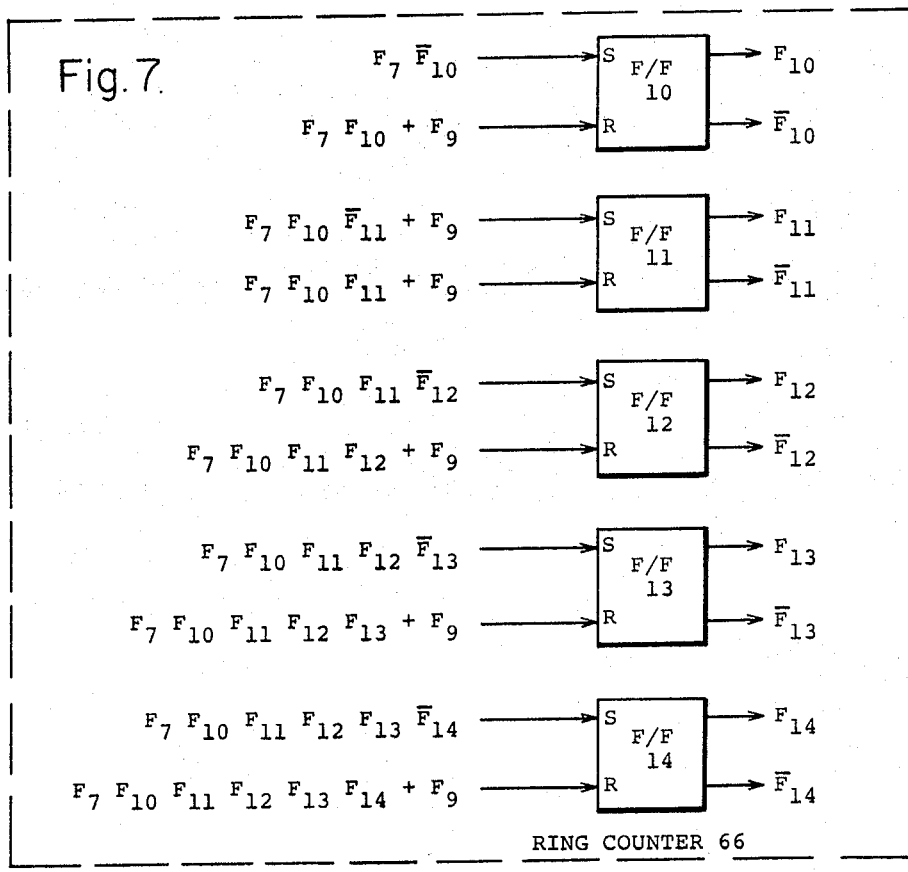

FIG. 7 illustrates one suitable mechanization for ring counter 66; and as there shown the ring counter comprises five F/Fs designated 10 through 14, with F/F-10 providing the least significant digit of the counter's output signal, and F/F-14 supplying the most significant digit. Ring counter 66 operates to count the number of sets of 31 clock pulses each, which occur during the presence of clutter gate signal, i.e. during the time interval F/F-7 is set. To rephrase this last point in a slightly different manner, during the time period of the clutter gate signal, counter 66 counts clock pulses up to the count of 31 and then resets and repeats the counting sequence. Hence the ring counter's count is indicative of the number of uncompressed ranging intervals (31 range bins) during which clutter energy has been detected.

Figure 8:
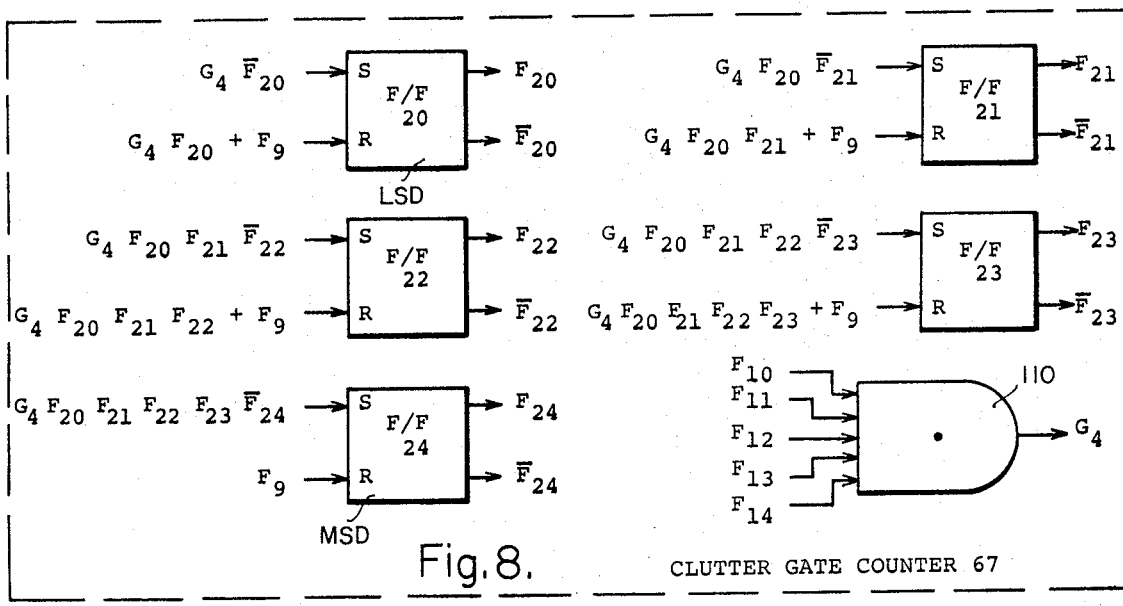

Clutter gate counter 67 is shown in FIG. 8 as comprising F/F-20 through 24 and AND gate 110. Gate 110 provides an output signal $G_4$ when the ring counter 66 reaches a count of 31. F/F-20 provides the least significant digit of the clutter gate counter's output signal, and F/F-23 provides the most significant digit.

PRF sequence counter 86 of FIG. 2 is shown in greater detail in FIG. 9 as comprising F/F-30 through 33, with F/F-30 providing the least significant digit of the output signal and F/F-33 the most significant digit. The signal $G_5$ utilized in the mechanization of the PRF sequence counter is indicative of the end of an MTI sequence at a given scan location. This signal $G_5$ is generated by logic control circuit 87 (FIGS. 2 and 10).

Logic control circuit 87 is shown in greater detail in FIG. 10 as comprising an arrangement of AND gates 111 through 116 and OR gates 117 and 118 for providing the signal $G_5$. AND gate 119 senses the signal $\overline{G}_5$ applied from inverter 120, at the delayed dead time trigger ($F_9$) period and sets a F/F-35 in response thereto. The output signal from F/F-35, $F_{35}$, is applied to system computer 57 (FIG. 1) which in response thereto commands the radar system to provide an additional transmission at the same scan location (inhibits an advance of the scan sequence). F/F-36 senses an E alarm signal during the fourth range sweep at any given scan location to provide the signal $F_{36}$ which locks the system in the pulse doppler mode. As mechanized in the illustrated embodiment, F/F-36 is reset after the occurrence of 12 range sweeps at the given scan location. However, the number of range sweeps comprising a doppler burst is a function of the number of doppler filters mechanized in the doppler processor 76 (FIG. 2) and of the system's application. Further, it is within the scope of the invention to mechanize an adaptive number of range sweeps for the doppler burst as a function of the content of the clutter gate counter, such as counter 267 of channel 70 (FIG. 3).

The implementation of the up-down counter, clutter gate, ring counter and clutter gate counter for channels 69 and 70 of FIG. 3 could be identical to that described hereinabove relative to channel 62; and corresponding F/Fs and the output signals provided thereby could be assigned corresponding numerical reference designations in the 100 and 200 series respectively. For example, the least significant digit of clutter gate counter 167 (FIG. 3) would be the signal $F_{120}$ and for counter 267 it would be $F_{220}$.

FIG. 11 shows the mechanization of A alarm F/F-68 which provides an output signal indicative of clutter detection on the raw video signal. FIG. 12 depicts the mechanization of alarm F/Fs 168 associated with channel 69 of FIG. 3, with F/F-B providing an alarm signal indicative of clutter detection in the output signal of the first canceller unit during the second or succeeding range sweeps; and F/F-C providing an output alarm signal indicative of clutter detection in the first clutter canceller's output signal during the third or succeeding range sweeps. FIG. 13 illustrates the mechanization of alarm F/F-268 associated with channel 70; with F/F-D providing an alarm output signal indicative of clutter detection in the output signal from the second clutter canceller during the third and succeeding range sweeps; and F/F-E provides an output signal indicative of clutter detection in the output signal from the second clutter canceller during the fourth and succeeding range sweeps.

In the implementation of the alarm circuits of FIGS. 11 through 13, a count of three in the associated clutter gate counter is sensed as a clutter alarm indication. However, the alarm threshold valve, i.e., the number of sets of uncompressed range bin intervals (31 clock pulse periods) during which clutter must be detected to provide a clutter alarm indication will vary as a function of the system's application. Also the clutter threshold level need not be selected at the same value for the various channels.

Figure 14:
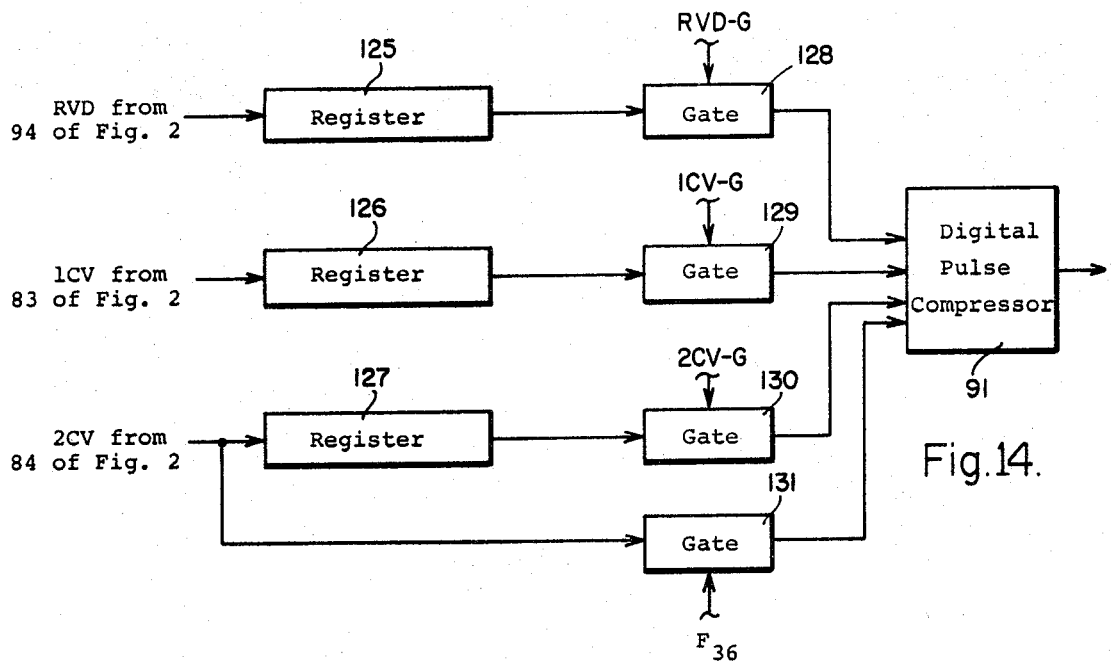
FIG. 14 is a block diagram of a gating arrangement implementation of the selection circuit shown in FIG. 2.

Referring now to FIG. 14 which shows the selection circuit 90 (FIG. 2) in greater detail, storage registers 125 through 127 store one range sweep of data from the raw video, first clutter canceller, and second clutter canceller channels, respectively. Gates 128 through 131, when enabled, couple the signals applied thereto, to digital pulse compression circuit 91 (FIG. 2).

Figure 15:
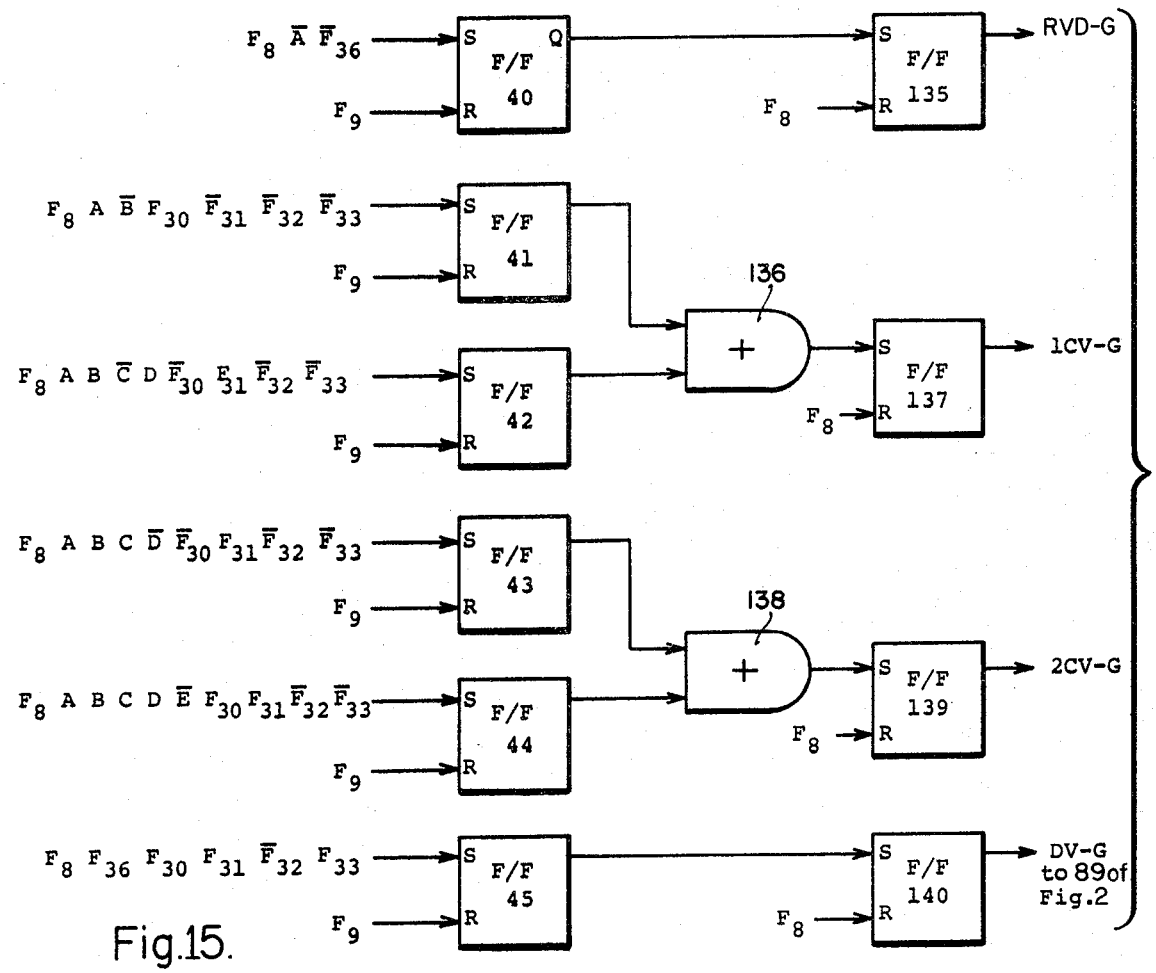
FIG. 15 is a block diagram of logic circuits for controlling the gates shown in FIG. 14.

The circuits for enabling the proper one of the gates 128 through 131, mechanized in accordance with the logical operations indicated in Table II above, are shown in FIG. 15. It is noted that the selection circuit 90 only applies signals to pulse compressor 91 from range sweeps in which one of the channels had less than a preselected maximum clutter energy content; or during the pulse doppler mode, as mechanized by gate 131.

F/F-40 of FIG. 14 is set during the dead time trigger period ($F_8$) following each range sweep if an A alarm signal has not been generated and if the system is not locked in the pulse doppler mode, as indicated by the $\overline{F}_{36}$ signal. The signal from the Q output terminal of F/F-40 triggers an F/F-135 which provides an output signal RVD-G to gate 128 of FIG. 14. F/F-35 is reset on the next range sweep by the $F_8$ signal, and hence provides an output pulse of one range sweep duration, whereby one range sweep of data is shifted out of register 125 into digital pulse compressor 91. If after the second range sweep at any given scan location, i.e. a PRF count of one at time $F_8$, an A alarm is present, but a B alarm is not, then F/F-41 applies a trigger signal through an OR gate 136 to a F/F-127. It is noted that the PRF count is one at the $F_8$ time period of the second range sweep, due to the mechanization of PRF sequence counter 86 in which the counter is incremented during the delayed dead time period ($F_9$). The F/F-137 provides an output signal designated 1CV-G which enables gate 129 of FIG. 14 whereby one range sweep of data is shifted out of register 126 into pulse compressor 91. Also if following the third range sweep A and B alarm signals are present but a C alarm is not, the output signal from F/F-42 is applied through OR 136 to trigger F/F-137. F/F-137 is reset one range sweep period, after being set, by the $F_8$ signal. Hence, the 1CV video is gated to pulse compressor 91 if a B alarm signal is not produced during the second range sweep or if a C alarm signal is not produced during the third range sweep.

An F/F-43 is set following the third range sweep if A, B and C alarms are present but a D alarm is not, and the output signal from F/F-43 is applied through an OR gate 138 to an F/F-139. The output signal from F/F-139, designated 2CV-G is applied to gate 130 of FIG. 14 and in response thereto one range sweep of data is transferred from register 127 to pulse compressor 91. Also, if following the fourth range sweep A, B, C and D alarms are present but an E alarm is not, F/F-44 is set and its output signal is applied through OR gate 138 to trigger one F/F-139. Hence the 2CV signals from register 127 are applied through gate 130 to pulse compressor 91 if a D alarm is not indicated following the third range sweep, or if an E alarm signal is not present following the fourth range sweep. Further, 2CV signals are applied through gate 131 during the pulse doppler mode of operation.

As explained above, if an E alarm signal is produced during the fourth range sweep, the system is locked in a pulse doppler mode for a predetermined number of range sweeps; and during this period selection circuit 90 applies the 2CV signals through pulse compressor 91 and gate 88 (FIG. 2) to pulse doppler processor 76. After the pulse doppler processing period, the range gated output signals of the doppler processor are applied through switch 89 (FIG. 2) to utilization device 61. Switch 89 is mechanized so that in the absence of the DV-G signal the output from pulse compressor 91 is coupled to utilization device 61; and during the period the DV-G signal is applied, the output of doppler processor 76 is coupled to utilization device 61. During the pulse doppler mode pulse compressor 91 processes 2CV signals having an unacceptable level of clutter energy; however, significant clutter energy had previously been removed therefrom by the first and second canceller units, so excessive dynamic range is not required in the pulse compressor circuits.

The signal DV-G is provided by F/F-45 and F/F-140 of FIG. 15. F/F-45 is set at the $F_8$ time period at the end of the pulse doppler mode; and the output signal therefrom triggers an F/F-140 which is reset by the $F_8$ signal of the following range sweep. The output signal of F/F-140 enables switch 89 (FIG. 2) for a sufficient time period to allow the range gated output signals of doppler processor 76 to be applied to utilization device 61.

To summarize the operation of the moving target processor in accordance with the invention, the clutter canceller units 83 and 84 have differing clutter cancellation characteristics which are a function of the number of consecutive range sweeps occurring at any given scan location. Clutter detection circuit 74 (FIG. 2) is coupled to data channels associated with the range video and the first and second canceller units; and provides alarm signals indicative of whether the respective data signals (not yet range compressed) have less than a predetermined clutter energy content. The alarm signals, in conjunction with the PRF count, are processed by logic control circuit 87 to determine if any of the data signals is acceptable. If an acceptable signal is present, the associated channel is coupled through selection circuit 90, digital pulse compressor 91, and switch 89 to utilization device 61, and the radar system is allowed to continue in its normal scanning sequence. However, if none of the data channels have an output signal with acceptable clutter content, then the radar is commanded to provide an additional transmission at the same scan location. Following the second transmission the data channels are again examined as to clutter content and if an acceptable output signal is sensed, it is coupled to the utilization device. If following the second range sweep period an acceptable output signal has not been produced, the radar is again ordered to provide another transmission at the same scan location. This sequence is repeated until the output signals from one of the data channels is acceptable or until a predetermined number of transmissions have taken place at the same scan position. This predetermined number may be equal to the number of range sweeps required for the second canceller to build up to its effective state, for example. After the predetermined number of transmission without an acceptable signal being produced, the processor locks the system into a pulse doppler mode and a relatively large number of range sweeps at the same scan location are processed by pulse doppler processor 76.

In the above described preferred embodiment only two clutter canceller units and one doppler processor unit are shown to illustrate the principles of the invention. However, it will be readily apparent to those skilled in the art that the scope of the subject invention is not restricted in any way to the number of clutter rejection units mechanized; but is adaptable to any number and type of such units. The modifications for clutter detection circuit 74, logic control circuit 87 and selection circuit 90 in accordance with the teachings of this invention, so as to accommodate various arrangements of canceller units, will be readily apparent to those skilled in the art. Also it will be apparent that only a single channel of the clutter detector circuit, such as channel 62 could be used for applications wherein only clutter detection and/or a clutter gate signal are required.

Hence there has been described a novel and improved moving target processor in which clutter reduction is performed prior to pulse compression; and wherein the clutter energy content of the output signals therefrom is held below a preselected value regardless of the clutter environment, and with the minimum of radar time.

What is claimed is:

1. A moving target signal processor for use with a scanning type energy transmission and reception system, said processor comprising:
   a plurality of clutter canceller units each adapted for processing successive range sweeps of received signals and having differing clutter cancellation characteristics which are a function of the number of range sweeps of received signals from the same scan location processed thereby; and means for sensing the clutter energy content in said received signals and in the output signals of said clutter canceller units, and for commanding additional transmissions at the same scan location, if during the current range sweep period the clutter energy content of said received signals and the output signals from said clutter canceller units is in excess of predetermined amounts.

2. The processor of claim 1 wherein said means for sensing clutter energy and for commanding additional transmissions includes:

clutter detection means for providing alarm signals during each range sweep period, which are indicative of clutter energy content in excess of said predetermined amounts in said received signals and in the output signals of said clutter canceller units, respectively, and logic control means responsive to said alarm signals, for providing control signals for commanding additional transmissions at the same scan location, if during the current range sweep period the clutter energy content of said received signals and the output signals from said clutter canceller units is in excess of said predetermined amounts.

3. The processor of claim 2 wherein said clutter detection means includes means for providing an alarm signal associated with any given clutter canceller unit only during selected range sweep periods in which effective output signals of reduced clutter content can be provided by said any given clutter canceller unit, said selected range sweep periods being predetermined as a function of the characteristics of said given clutter canceller unit.

4. The processor of claim 1 further comprising a signal output terminal; and selection means for determining if said received signals or one of said output signals from said clutter canceller units has less than said predetermined amounts of clutter energy, and for applying said signals with less than said predetermined amount of clutter energy to said output terminal.

5. The processor of claim 3 further comprising a signal output terminal; and selection means for determining if said received signals, or one of said output signals from said clutter canceller units during the respective selected range sweep periods associated with each of the clutter canceller units, has less said predetermined amounts of clutter energy, and for applying said signal with less than said predetermined amount of clutter energy to said output terminal.

6. The processor of claim 1 further including a doppler processor unit; and means for commanding a pulse doppler burst of successive transmissions, if the clutter energy content of said received signals and the output signals from said clutter canceller units is in excess of said predetermined amounts during a predetermined number of range sweep periods at the same scan location.

7. The processor of claim 5 further comprising a doppler processor unit; and means for commanding a pulse doppler burst of successive transmissions if the clutter energy content of said received signals and the output signals from said clutter canceller units during the respective selected range sweep periods associated with each of the clutter canceller units, is in excess of said predetermined amounts, during a predetermined number of range sweep periods at the same scan location.

8. The processor of claim 7 including means for sensing the completion of the pulse doppler burst and for then coupling the output of said doppler processor to said output terminal.

9. The processor of claim 2 adapted for use with a pulse compression type scanned energy transmission and reception system; and wherein said clutter detection means includes counter means for statically determining during each range sweep period if clutter energy content in excess of predetermined amounts is present in the uncompressed received signals and in the uncompressed output signals of said canceller units.

10. The processor of claim 9 wherein said counter means includes a plurality of processing channels, each of which is coupled to receive said received signals or the output signals from one of said clutter canceller units, and including: a threshold circuit for providing an output signal during range bin intervals in which the signals applied to said channel exceeds a threshold level; an up-down counter mechanized to count up towards a preselected maximum count during each range bin interval in which an output signal is provided by said threshold circuit, and for counting down towards a preselected minimum count during each range bin interval in which an output signal is not provided by said threshold circuit; and alarm means responsive to the count of said up-down counter for providing an alarm signal indicative of a clutter content in the applied signals in excess of said predetermined amount.

11. The processor of claim 10 further comprising a signal output terminal; and selection means for determining if said received signal or one of said output signals from said clutter canceller units has less than said predetermined amounts of clutter energy, and for applying said signal with less than said predetermined amount of clutter energy to said output terminal.

12. The processor of claim 11 further comprising a pulse compressor unit coupled to said signal output terminal for processing said signal having less than said predetermined amount of clutter energy content, so as to provide signals compressed in the range dimension.

13. The processor of claim 10 wherein said alarm means includes clutter gate counter means for counting range bin intervals, during a clutter gate interval starting when the count of said up-down counter is greater than a first number, and ending when the count is less than a second number; and means for providing said alarm signal in response to the count of said clutter gate counter means.

14. The processor of claim 13 wherein said clutter gate counter means includes a clutter gate circuit for providing a clutter gate signal during said clutter gate interval; a ring counter enable by said clutter gate signal for providing an output signal indicative of a group of a predetermined number of range bins having occurred during said clutter gate interval; and a clutter gate counter circuit for counting the number of said group of range bins occurring each range sweep period; and said alarm means includes an alarm logic circuit adapted to provide an alarm output signal when the count of said clutter gate counter circuit exceed a selected value.

15. The processor of claim 14 wherein said alarm means includes means for inhibiting the generation of said alarm output signal except during selected ones of the range sweeps at the same scan location.

16. A moving target signal processor for use with a scanning, pulse compression type energy transmission and reception system, said processor comprising:
- a plurality of clutter canceller units each adapted for processing range sweeps of uncompressed received signals;
- clutter detection means for statically determining during each range sweep if clutter energy content in excess of predetermined amounts is present in said uncompressed received signals and in the output signals of said clutter canceller units, respectively; and
- logic control means coupled to said clutter detection means for commanding an additional transmission at the same scan location if during the current range sweep the clutter energy content of said received signals and the output signals from said clutter canceller units is in excess of said predetermined amounts.

17. The processor of claim 16 further comprising a signal output terminal; and selection means coupled to said clutter detection means for determining if said received signals or if one of said output signals from said clutter canceller units has less than said predetermined amount of clutter energy, and for applying said signals with less than said predetermined amount of clutter energy to said output terminal.

18. The processor of claim 17 further comprising a pulse compressor unit coupled to said signal output terminal for processing said signals having less than said predetermined amounts of clutter energy, so as to provide time compressed output signals having less than said predetermined amount of clutter content.

19. The processor of claim 17 further comprising a doppler processor unit; and said logic control means includes means for providing a doppler command signal for commanding a pulse doppler burst of successive transmissions if the clutter energy content of said received signals and the output signals from said clutter canceller units is in excess of said predetermined amounts during a predetermined number of range sweep periods at the same scan location.

20. The processor of claim 19 wherein said selection means includes means for sensing the completion of the pulse doppler burst and for then coupling the output of said doppler processor to said output terminal.

21. The processor of claim 16 wherein said clutter detection means includes counter means for statically determining during each range sweep period if clutter energy content in excess of predetermined amounts is present in the uncompressed received signals and in the uncompressed output signals of said canceller units.

22. The processor of claim 21 wherein said counter means includes a plurality of processing channels, each of which is coupled to receive said received signals or the output signals from one of said clutter canceller units, and including: a threshold circuit for providing an output signal during range bin intervals in which the signals applied to said channel exceeds a threshold level; an up-down counter mechanized to count up towards a preselected maximum count during each range bin interval in which an output signal is provided by said threshold circuit, and for counting down towards a preselected minimum count during each range bin interval in which an output signal is not provided by said threshold circuit; and alarm means responsive to the count of said up-down counter for providing an alarm signal indicative of a clutter content in the applied signals in excess of said predetermined amount.

23. The processor of claim 22 wherein said alarm means includes clutter gate counter means for counting range bin intervals during a clutter gate interval starting when the count of said up-down counter is greater than a first number, and ending when the count is less than a second number; and means for providing said alarm signal in response to the count of said clutter gate counter means.

24. The processor of claim 23 wherein said clutter gate counter means includes a clutter gate circuit for providing a clutter gate signal during said clutter gate interval; a ring counter enabled by said clutter gate signal for providing an output signal indicative of a group of a predetermined number of range bins having occurred during said clutter gate interval; and a clutter gate counter circuit for counting the number of said group of range bins occuring each range sweep period; and said alarm means includes an alarm logic circuit adapted to provide an alarm output signal when the count of said clutter gate counter circuit exceed a selected value.

25. A device for detecting clutter energy in the received signals from a pulse compression type energy transmission and reception system, said device comprising:
- a threshold circuit for providing an output signal during range bins intervals in which the received signals exceeds a threshold level;
- an up-down counter mechanized to count up towards a preselected maximum count during each range bin interval in which an output signal is provided by said threshold circuit, and for counting down towards a preselected minimum count during each range bin interval in which an output signal is not provided by said threshold circuit; and
- alarm means responsive to the count of said up-down counter for providing an alarm signal indicative of a clutter content in the applied signal in excess of a predetermined amount.

26. The device of claim 25 wherein said alarm means includes clutter gate counter means for counting range bin intervals, during a clutter gate time interval starting when the count of said up-down counter is greater than a first number, and ending when the count is less than a second number; and means for providing said alarm signal in response to the count of said clutter gate counter means.

27. The device of claim 26 wherein said clutter gate counter means includes a clutter gate circuit for providing a clutter gate signal during said clutter gate interval; a ring counter enable by said clutter gate signal for providing an output signal indicative of a group of a predetermined number of range bins having occurred during said clutter gate interval; and a clutter gate counter circuit for counting the number of said group of range bins occuring each range sweep period; and said alarm means includes an alarm logic circuit adapted to provide an alarm output signal when the count of said clutter gate counter circuit exceed a selected value.

* * * * *